(12) United States Patent
Kaneko et al.

(10) Patent No.: US 9,045,100 B2
(45) Date of Patent: Jun. 2, 2015

(54) SHOCK ABSORBING MEMBER

(71) Applicants: AISIN SEIKI KABUSHIKI KAISHA, Kariya-shi, Aichi-ken (JP); AISIN KEIKINZOKU KABUSHIKI KAISHA, Imizu-shi, Toyama-ken (JP)

(72) Inventors: Takanobu Kaneko, Kariya (JP); Kiyoichi Kita, Imizu (JP); Tamaki Obayashi, Imizu (JP); Yuta Takanami, Imizu (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 14/160,685

(22) Filed: Jan. 22, 2014

(65) Prior Publication Data

US 2014/0203578 A1 Jul. 24, 2014

(30) Foreign Application Priority Data

Jan. 24, 2013 (JP) ................................. 2013-011046

(51) Int. Cl.
*B60R 19/34* (2006.01)

(52) U.S. Cl.
CPC ..................................... *B60R 19/34* (2013.01)

(58) Field of Classification Search
CPC ....................................................... B60R 19/34
USPC .................. 296/187.09, 187.1; 293/133, 154
See application file for complete search history.

(56) References Cited

U.S. PATENT DOCUMENTS

| | | | | |
|---|---|---|---|---|
| 5,772,267 A * | 6/1998 | Heim et al. | .................. | 293/133 |
| 6,988,753 B1 * | 1/2006 | Omura et al. | .................. | 293/13 |
| 8,056,926 B2 | 11/2011 | Okabe et al. | | |
| 2001/0024051 A1 * | 9/2001 | Kariatsumari et al. | ....... | 296/155 |
| 2003/0034661 A1 * | 2/2003 | Gotanda et al. | ............... | 293/155 |
| 2005/0104393 A1 * | 5/2005 | Haneda et al. | ............... | 293/133 |
| 2011/0012381 A1 * | 1/2011 | Saito et al. | .................... | 293/133 |
| 2011/0193371 A1 * | 8/2011 | Klimek | ..................... | 296/187.09 |
| 2013/0234456 A1 * | 9/2013 | Brockhoff et al. | ............ | 293/133 |
| 2014/0091585 A1 * | 4/2014 | Ramoutar et al. | ............ | 293/133 |

FOREIGN PATENT DOCUMENTS

| | | |
|---|---|---|
| JP | 2009-83756 | 4/2009 |
| JP | 4493945 | 4/2010 |
| JP | 2010-100259 | 5/2010 |
| JP | 4926018 | 2/2012 |

* cited by examiner

*Primary Examiner* — Jason S Morrow
(74) *Attorney, Agent, or Firm* — Finnegan, Henderson, Farabow, Garrett & Dunner, LLP

(57) ABSTRACT

A shock absorbing member provided between a side member extending in a front-rear direction of a vehicle and a bumper reinforcement extending in a vehicle width direction and provided at the side member, includes: a shock absorbing portion, which extends in the front-rear direction of the vehicle and is supported by the side member and which is configured to absorb an impact caused by a load by being compressed in the front-rear direction of the vehicle when the load is applied to the bumper reinforcement in at least one of a forward direction and a backward direction; and a bumper reinforcing portion, which extends from an end portion side closer to the side member in the impact absorbing portion toward a vehicle-width-direction outside and a bumper reinforcement side and which reinforces the vehicle-width-direction end portion side of the bumper reinforcement.

5 Claims, 5 Drawing Sheets

SHOCK ABSORBING MEMBER

CROSS-REFERENCE TO RELATED APPLICATION

This application claims priority from Japanese Patent Application No. 2013-011046 filed on Jan. 24, 2013, the entire subject matter of which is incorporated herein by reference.

TECHNICAL FIELD

This disclosure relates to a shock absorbing member of absorbing an impact by being deformed in the event of a vehicle collision.

BACKGROUND

As described, for example, in JP-B-4493945 and JP-B-4926018, there is a vehicle equipped with a shock absorbing member for absorbing an impact by deformation at the time of a vehicle collision. This vehicle is provided with a side member extending in a front-rear direction of the vehicle, and a bumper reinforcement that extends in a vehicle width direction on the front (or rear) of the side member. The shock absorbing member extends in the front-rear direction of the vehicle, the rear end portion (or front end portion) thereof is connected to the front end portion (or rear end portion) of the side member, and the front end portion (or rear end portion) is connected to a vehicle-width-direction intermediate portion that is positioned a little more inside than the vehicle width end portion of the bumper reinforcement. When an object collides with the front end (or rear end) of the vehicle, the shock absorbing member is compressed in the axial direction (front-rear direction of the vehicle) to thereby absorb the impact caused by the collision.

Further, the vehicle disclosed in JP-B-4926018 further includes an upper member which extends towards the vehicle-width-direction end portion of the bumper reinforcement from a front pillar, which is located above the side member. Like the side member, the upper member is connected to the vehicle-width-direction end portion of the bumper reinforcement through the shock absorbing member. That is, in the bumper reinforcement, the vehicle-width-direction intermediate portion is supported by the side members through the shock absorbing member (an inside shock absorbing member), and the vehicle-width-direction end portion is also supported by the upper member via an additional shock absorbing member (an outside shock absorbing member).

SUMMARY

According to the vehicle described in JP-B-4493945, since the vehicle-width-direction end portion (outside portion in the vehicle width direction than the shock absorbing member) of the bumper reinforcement is not supported by the shock absorbing member, it is lower in its strength than the inside portion thereof. Accordingly, when an object collides in the narrow area (for example, as in the small overlap impact test, the portion from the vehicle-width-direction intermediate portion of the front end of the vehicle to the vehicle-width-direction end portion) of the vehicle-width-direction end portion during vehicle running, there is a possibility that the vehicle-width-direction end portion of the bumper reinforcement is bent. In the case where the vehicle-width-direction end portion of the bumper reinforcement is bent, the direction of the load acting on the shock absorbing member through the portion which is bent is inclined with respect to the axial direction of the shock absorbing member. The shock absorbing member is not compressed in the axial direction, as a result, the shock is not significantly absorbed.

On the other hand, according to the vehicle described in JP-B-4926018, the vehicle-width-direction intermediate portion is supported by the side members via the inside impact absorbing member, and the vehicle-width-direction end portion is also supported by the upper member via the outside impact absorbing member. Therefore, when an object collides with a small area of the vehicle width direction, the vehicle-width-direction end portion of the bumper reinforcement is suppressed from bending. Therefore, the impact is sufficiently absorbed because the inside shock absorbing member and the outside shock absorbing member is compressed respectively in the axial direction thereof. However, the structure of the vehicle front end portion is not only complicated, but also has a large number of components in comparison with the vehicle described in JP-B-4493945. Further, it can be applied only to vehicles with special chassis structure in which an upper member is extended to the vicinity of the bumper reinforcement, and accordingly, it results in a lack in versatility.

This disclosure provides at least an inexpensive shock absorbing member that can efficiently absorb an impact caused by a collision when an object collides with a narrow area of a vehicle-width-direction end portion in a front end or a rear end of a vehicle.

A shock absorbing member of this disclosure is provided between a side member extending in a front-rear direction of a vehicle and a bumper reinforcement extending in a vehicle width direction and provided at at least one of a front and a rear of the side member, and the shock absorbing member includes: a shock absorbing portion, which extends in the front-rear direction of the vehicle and is supported by the side member and which is configured to absorb an impact caused by a load by being compressed in the front-rear direction of the vehicle when the load is applied to the bumper reinforcement in at least one of a forward direction and a backward direction; and a bumper reinforcing portion, which extends from an end portion side closer to the side member in the impact absorbing portion toward a vehicle-width-direction outside and a bumper reinforcement side and which supports a vehicle-width-direction end portion side of the bumper reinforcement to reinforce the vehicle-width-direction end portion side of the bumper reinforcement.

Meanwhile, the term "an end portion side closer to the side member in the shock absorbing member" corresponds an end portion closer to the side member in the shock absorbing member and a portion located at the side member side in the front-rear direction intermediate portion of the shock absorbing member. Further, the term "vehicle-width-direction end portion side of the bumper reinforcement" means at least one portion of the part extending from a portion located at the front (or rear) of the side member in the bumper reinforcement to an end side closer to the side member of both ends of the vehicle width direction of the bumper reinforcement.

According to this disclosure, since the vehicle-width-direction end portion side of the bumper reinforcement is supported by the bumper reinforcing portion, when an object collides with the narrow area (a portion extending from a portion located on the front (or rear) of the side member to one end of the vehicle width direction) of the vehicle-width-direction end side at the front end (or rear end) of the vehicle, it is possible to suppress bending of the vehicle-width-direction end portion of the bumper reinforcement. Accordingly, a load is applied parallel with the axial direction of the shock absorbing portion, and the shock absorbing portion is thereby compressed in the axial direction. Therefore, it is possible to efficiently absorb the impact caused by the collision. Further, the bumper reinforcing portion is formed to extend from the end portion side closer to the side member in the shock absorbing portion toward the the vehicle-width-direction outside and the bumper reinforcement side. That is, the extending direction of the bumper reinforcement member is inclined with respect to the extending direction of the side member. Therefore, to the front end (or rear end) of the side member, the load due to the collision is applied in the backward direction and also the inside direction of the vehicle width direction (or, the forward direction and also the inside direction of the vehicle width direction). By causing the shock absorbing portion to effectively absorb the impact caused by the collision, and also the load toward the inside of the vehicle width direction to act on the front end (or rear end) of the side member, the vehicle body is suppressed from progressing as being rotated centered on the object thereby causing the vehicle body to proceed in a direction substantially parallel to the traveling direction before the collision. Thus, it is possible to minimize the impact on the vehicle and passengers. Further, since the upper member and the shock absorbing member, which is connected to the upper member as in the vehicle disclosed in JP-B-4926018, is not required, it is possible to reduce the number of parts while simplifying the structure of the front end of the vehicle. Further, since the bumper reinforcing portion is formed so as to extend in the outward direction of the vehicle width direction from the shock absorbing portion, and the shock absorbing member of this disclosure can be applied to an ordinary vehicle, not the vehicle having the specific chassis structure as shown in JP-B-4926018, its versatility is high.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
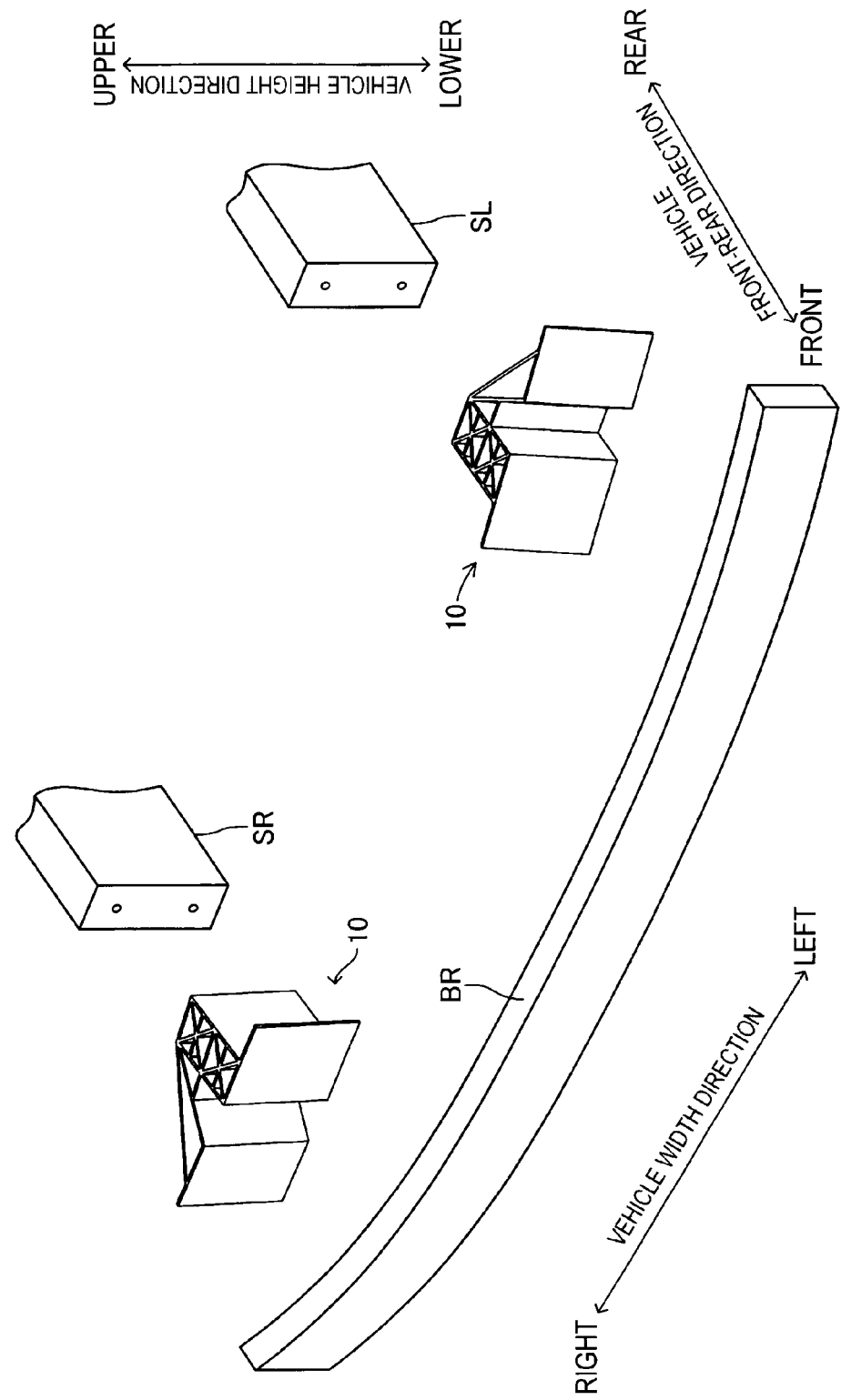
FIG. 1 is an exploded perspective view schematically showing a configuration of a front portion of a vehicle, to which a shock absorbing member is applied, according to an exemplary embodiment of this disclosure.
Figure 2:
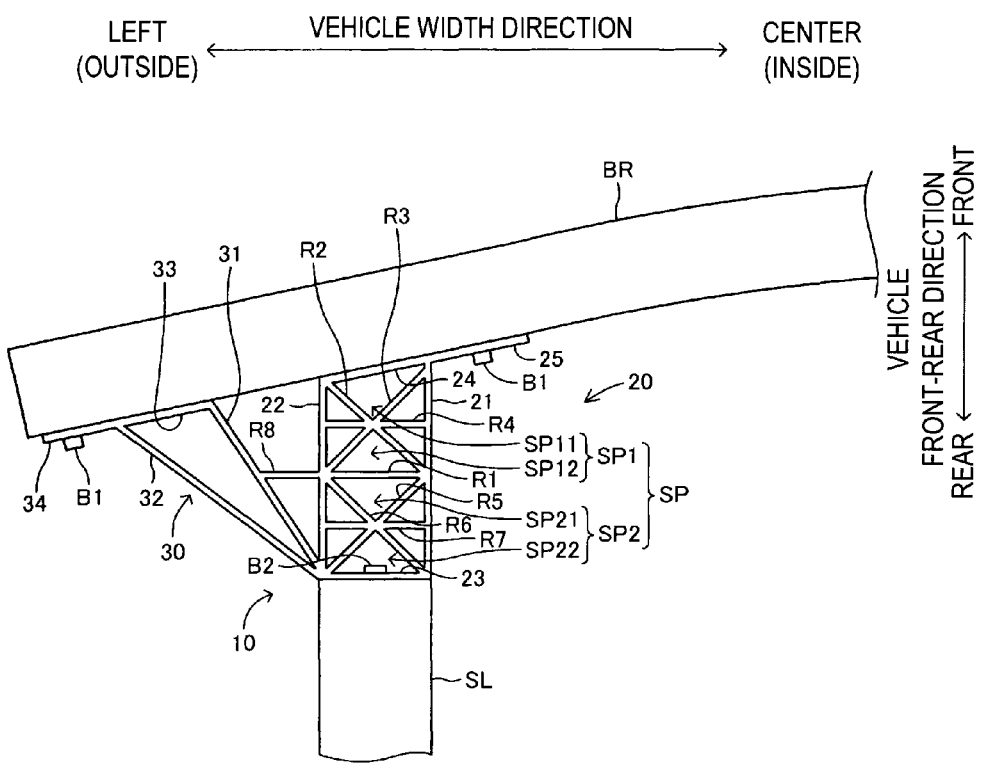
FIG. 2 is an enlarged plan view of a left portion of a front end of the vehicle shown in FIG. 1.

A shock absorbing member 10 will be described according to an exemplary embodiment of this disclosure. First, a configuration of a front portion of a vehicle 1 to which a shock absorbing member 10 is assembled will be briefly described. As shown in FIGS. 1 and 2, the vehicle 1 is provided with a left-and-right pair of side members SL, SR, which are spaced apart from each other in the vehicle width direction and extend respectively in the vehicle front-rear direction, and a bumper reinforcement BR, which extends from a left end to a right end of the vehicle width direction in the vehicle, at the front of the side members SL, SR. The side members SL, SR are respectively located a distance of about ¼ of the vehicle width from the right-and-left ends of the vehicle width direction. The bumper reinforcement BR is curved in the front-rear direction of the vehicle so that the vehicle-width-direction outside portion is positioned slightly behind the vehicle-width-direction inside portion in a plan view. The side members SL, SR are connected to the bumper reinforcement BR via the shock absorbing members 10 and 10, respectively. In the present exemplary embodiment, the bumper reinforcement BR and the shock absorbing members 10, 10 are described as members provided at the front with respect to the vehicle interior, but this disclosure may be applied to a case where they are provided at the rear with respect to the vehicle interior. Further, FIG. 2 shows only the left end of the vehicle width direction on the front portion of the vehicle 1. The right end of the vehicle width direction will not be described because it is symmetrical to the left end of the vehicle width direction on the front of the vehicle 1.

Next, the shock absorbing member 10 will be explained. As shown in FIG. 2, the shock absorbing member 10 is provided with the shock absorbing portion 20 and the bumper reinforcing portion 30. The shock absorbing portion 20 and the bumper reinforcing portion 30 are integrally formed by extrusion molding. The extrusion direction during the extrusion process corresponds to the direction of vehicle height when the shock absorbing member 10 is assembled to the vehicle. Therefore, the shock absorbing member 10 exhibits the same cross section along the vehicle height direction. The shock absorbing portion 20 is provided at extend in the front-rear direction of the vehicle. The rear end of the shock absorbing portion 20 is fastened to the front end of the side member SL. The front end of the shock absorbing member 10 is connected to the vehicle-width-direction intermediate portion (portion located at the front of the side member SL) of the bumper reinforcement BR. The axial direction of the shock absorbing portion 20 coincides with the front-rear direction of the vehicle in a state where the shock absorbing member 10 is assembled to the vehicle 1. When the object OB (FIG. 3) collides with the front end of the vehicle, the shock absorbing portion 20 is compressed in the axial direction to thereby absorb the impact caused by the collision.

The shock absorbing portion 20 includes an inner wall portion 21 and an outer wall portion 22 extending in the front-rear direction of the vehicle. The outer wall portion 22 is arranged at the vehicle-width-direction outside with respect to the inner wall 21 (leftward in FIG. 2). The rear end position of the inner wall 21 and the rear end position of the outer wall portion 22 are identical. Since the bumper reinforcement BR is curved as described above, the front end of the outer wall portion 22 is positioned slightly behind the front end of the inner wall 21. The rear end of the inner wall portion 21 and the rear end of the outer wall portion 22 are connected to each other by the rear wall portion 23 extending in the vehicle width direction, and the front end of the inner wall portion 21 and the front end of the outer wall portion 22 are connected to each other by the front wall portion 24 extending along the rear face of the bumper reinforcement BR. The rear wall portion 23 is formed thereon with a through hole penetrating from the front face to the rear face thereof. Further, the front end of the inner wall portion 21 is formed thereon with a flange portion 25 extending towards the vehicle-width-direction inside (to the right in FIG. 2) along the rear face of the bumper reinforcement BR. The flange portion 25 is formed with a through hole penetrating from the front face to the rear face.

The ribs R1 to R7 are formed in the space SP surrounded by the inner wall portion 21, outer wall portion 22, rear wall portion 23 and front wall portions 24. The rib R1 is extended toward the vehicle-width-direction outside from the front-rear direction central portion of the inner wall 21 and connected to the outer wall portion 22. The ribs R2 and R3 are respectively formed to connect the opposite angles of the space SP1, which is substantially rectangular-shaped in a plane view and surrounded by the inner wall portion 21, outer wall portion 22, front wall portion 24, and rib R1. The rib R4 extends toward the vehicle-width-direction inside and outside from the intersection of the rib R2 and the rib R3 and is connected to the inner wall portion 21 and outer wall portion 22. The space SP1 is divided into two spaces by the rib R4. The front space of the rib R4 is referred to as a space SP11 and the rear space of the rib R4 is referred to as a space SP12.

The ribs R5 and R6 are respectively formed to connect the opposite angles of the space SP2, which is substantially rectangular-shaped in a plane view and surrounded by the inner wall portion 21, outer wall portion 22, rear wall portion 23, and rib R1. The rib R7 extends toward the vehicle-width-direction inside and outside from the intersection of the rib R5 and the rib R6 and is connected to the inner wall portion 21 and outer wall portion 22. The space SP2 is divided into two spaces by the rib R7. The front space of the rib R7 is referred to as a space SP21 and the rear space of the rib R7 is referred to as a space SP22.

The bumper reinforcing portion 30 is formed at the vehicle-width-direction outside (left side in FIG. 2) of the outer wall 22 of the shock absorbing portion 20. The front portion of the bumper reinforcing portion 30 is fastened in the vehicle-width-direction left end of the bumper reinforcement BR. The bumper reinforcing portion 30 supports the rear face of the vehicle-width-direction left end (at least a portion of the part extending from the portion located in the front of the side member SL to the left end thereof) of the bumper reinforcement BR. The bumper reinforcing portion 30 includes the inner wall portion 31 and the outer wall portion 32 which extends toward the vehicle-width-direction outside and the front direction from the rear end portion of the outer wall portion 22. The outer wall portion 31 is disposed at the vehicle-width-direction outside with respect to the inner wall portion 31. As described above, since the bumper reinforcement BR is curved, the front end of the outer wall portion 32 is positioned slightly behind the front end of the inner wall portion 31. The front end of the inner wall 31 and the front end of the outer wall portion 32 are connected to each other by the front wall portion 33 extending along the rear face of the bumper reinforcement BR. In addition, the rear end of the inner wall portion 31 and the rear end of the outer wall portion 32 are connected to the rear end of the outer wall portion 22 of the shock absorbing portion 20 at the same position in the front-rear direction. Incidentally, the rear end of the inner wall 31 and the rear end of the outer wall portion 32 may be connected to a middle portion (for example, a portion positioned at an end side, rather than a center portion, in the front-rear direction) in the front-rear direction of the outer wall portion 22, not to the rear end of the outer wall 22. Further, the front end of the outer wall portion 32 is formed thereon with a flange portion 34 extending in the vehicle-width-direction outside along the rear face of the bumper reinforcement BR. The flange portion 34 is provided thereon with a through hole penetrating the front face to the rear face. Further, the rib R8 extends in the vehicle-width-direction outside from the central portion in the front-rear direction of the outer wall portion 22 and connected to the front-rear direction central portion of the inner wall portion 31.

The bolts B1 are inserted into the through hole formed in the flange portion 25 and the through hole formed in the flange portion 34, and the front end portion of the shock absorbing member 10 is fastened, by the bolt B1, to the rear end face of the bumper reinforcement BR. Further, the bolt B2 is inserted into the through hole formed in the rear wall portion 23, and the rear end portion of the shock absorbing member 10 is fastened, by the bolt B2, to the side member SL.

Figure 3:
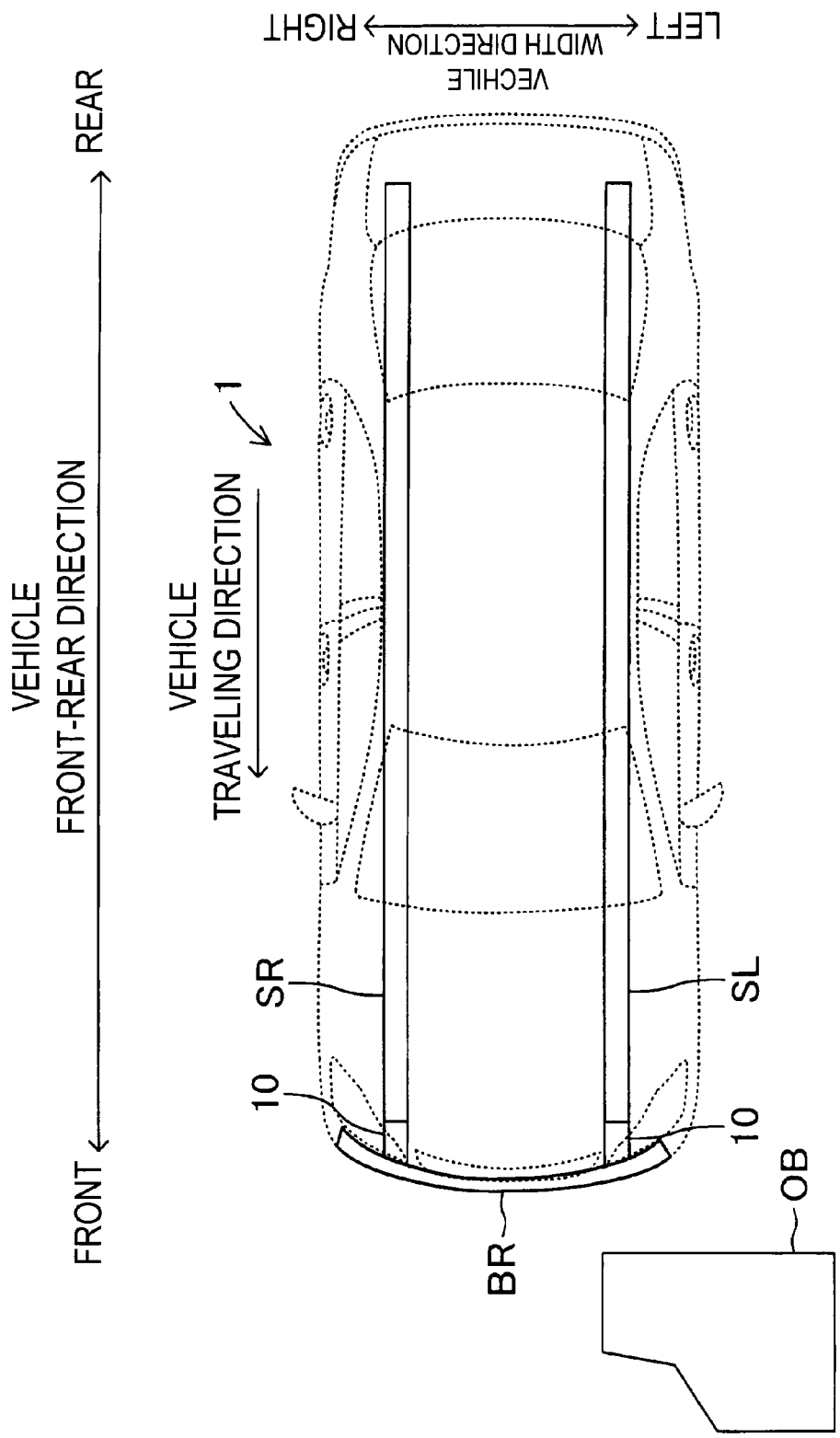
FIG. 3 is a schematic diagram showing an outline of a small overlap crash test.

As shown in FIG. 3, when the object OB collides with the portion, as a front end portion of the vehicle 1, extending from the portion located at the front of the side members SL to the vehicle-width-direction left end, the object OB progresses into the vehicle interior side while deforming the bumper reinforcement BR and the shock absorbing member 10. At this time, since the rear face of the vehicle-width-direction left end of the bumper reinforcement BR is supported by the bumper reinforcing portion 30, it is possible to suppress bending of the vehicle-width-direction left end of the bumper reinforcement BR. Therefore, a load to the shock absorbing portion 20 is applied in the axial direction. Then, in the inner wall portion 21 and the outer wall portion 22 of the shock absorbing portion 20, the portions located between the front wall portion 24 and the rib R4 first buckle, respectively. Since the rib R2 and rib R3 are provided so as to connect the opposite angles in the space SP1, among the inner wall portion 21 and the outer wall portion 22, the portions which are located between the front wall portion 24 and the rib R4 buckle at about the same time. In other words, the space SP11 is compressed in the axial direction. Thereafter, the spaces SP12, SP21, SP22 are compressed, in its order, in the axial direction thereof in the same manner as the space SP11. Therefore, according to the shock absorbing member 10, it is possible to efficiently absorb the impact caused by the collision of the object OB. While the shock absorbing portion 20 is gradually compressed in the axial direction, the bumper reinforcing portion 30 is also somewhat deformed.

The bumper reinforcing portion 30 is formed to extend from the rear end portion (end portion of the side member SL side) of the shock absorbing portion 20 toward the outside of the vehicle width direction and the front (bumper reinforcement BR side). That is, the extending direction of the bumper reinforcing portion 30 is inclined with respect to the extending direction of the side member SL. Therefore, the load due to the collision to the front end (or rear end) of the side member SL is applied in the backward direction and the inside of the vehicle width direction. By causing the shock absorbing portion 20 to effectively absorb the impact caused by the collision, and also, the load toward the inside of the vehicle width direction to act on the front end of the side member SL, the vehicle body is suppressed from progressing as being rotated centered on the object OB thereby causing the vehicle body to proceed in the direction substantially parallel to the traveling direction before the collision. Thus, it is possible to minimize the impact on the vicinity of the vehicle and passengers. Further, since the upper member the upper member and the shock absorbing member which is connected to the upper member as in the vehicle disclosed in JP-B-4926018, is not required, it is possible to reduce the number of parts while simplifying the structure of the front end of the vehicle. Furthermore, the bumper reinforcing portion is formed so as to extend in the outward direction of the vehicle width direction from the shock absorbing portion 20, and the shock absorbing member of this disclosure can be applied to an ordinary vehicle, not the vehicle having the specific chassis structure as shown in JP-B-4926018, thus, its versatility is high.

Further, since the shock absorbing member 10 is formed integrally by extrusion molding, it is possible to reduce the number of processes as compared with the case where the bumper reinforcing portion 30 and the shock absorbing portion 20 are separately manufactured respectively, and then the shock absorbing member is formed by joining the two. Therefore, the shock absorbing member can be manufactured at low cost.

Further, the shock absorbing portion 20 and the bumper reinforcing portion 30 are connected to each other by the rib R8. That is, the bumper reinforcing portion 30 is supported not only by the shock absorbing portion 20 at its rear end, but also by the shock absorbing portion 20 via the rib R8 at the front-rear direction central portion thereof. Therefore, it is possible to improve the strength of the bumper reinforcing portion 30. Further, it is possible to improve the formability when the shock absorbing portion 20 and the bumper reinforcing portion 30 are integrally formed by extrusion molding.

In the shock absorbing member according to one aspect of this disclosure, the bumper reinforcing portion is formed so that a width of the bumper reinforcing portion in the vehicle width direction becomes longer as forwarding to the end portion of the bumper reinforcement side from the end portion closer to the side member of both the end portions of the vehicle front-rear direction of the bumper reinforcing portion.

In the shock absorbing member according to one aspect of this disclosure, the bumper reinforcing portion comprises: a first support portion, which extends toward the vehicle-width-direction outside and the bumper reinforcement side from the end portion side closer to the side member in the impact absorbing portion and which is connected to the vehicle-width-direction end portion side of the bumper reinforcement; and a second support portion, which extends toward a vehicle-width-direction end part, which is an outer side than the first support portion, and the bumper reinforcement side from the end portion side closer to the side member in the impact absorbing portion and which is connected to the vehicle-width-direction end portion side of the bumper reinforcement.

In the shock absorbing member according to one aspect of this disclosure, the shock absorbing portion and the bumper reinforcing portion are formed integrally by extrusion molding.

In the shock absorbing member according to one aspect of this disclosure, a connecting portion connects the shock absorbing portion and the bumper reinforcing portion.

In the shock absorbing member according to one aspect of this disclosure, the bumper reinforcing portion is configured to deform toward an outer side in the vehicle-width-direction in case that an collusion is applied to the bumper reinforcement in the at least one of the front and the rear of the vehicle.

Further, this disclosure is not limited to the above embodiments, but various modifications are possible without departing from the scope of this disclosure.

For example, in the above embodiments, the bumper reinforcing portion 30 is formed in a hollow shape, but may be formed in a solid type. Further, the bumper reinforcing portion 30 may be formed in a rod-like or plate-like shape.

Figure 4A:
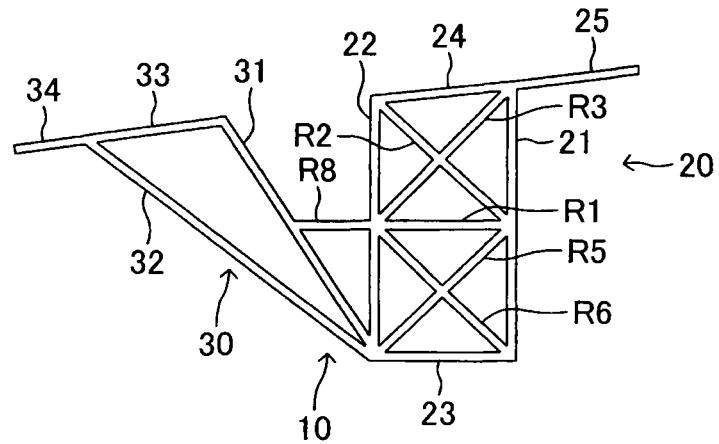
FIG. 4A is a plan view of a shock absorbing member, in which two ribs extending in the vehicle width direction in the shock absorbing portion of FIG. 2 are omitted.
Figure 4B:
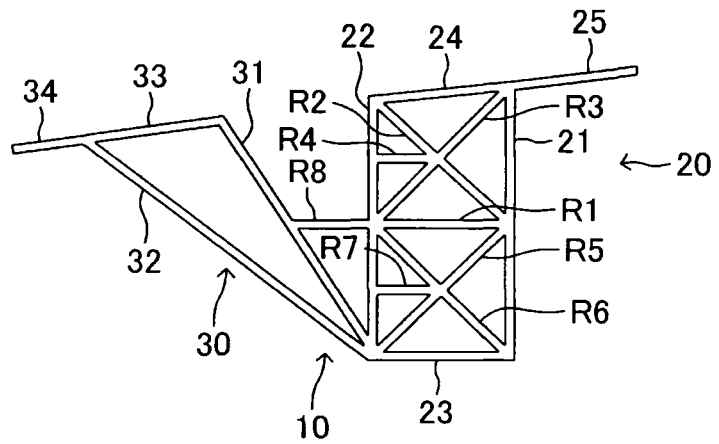
FIG. 4B is a plan view of the shock absorbing member, in which a portion of an outer wall side of the two ribs extending in the vehicle width direction of the shock absorbing portion of FIG. 2 is omitted.
Figure 4C:
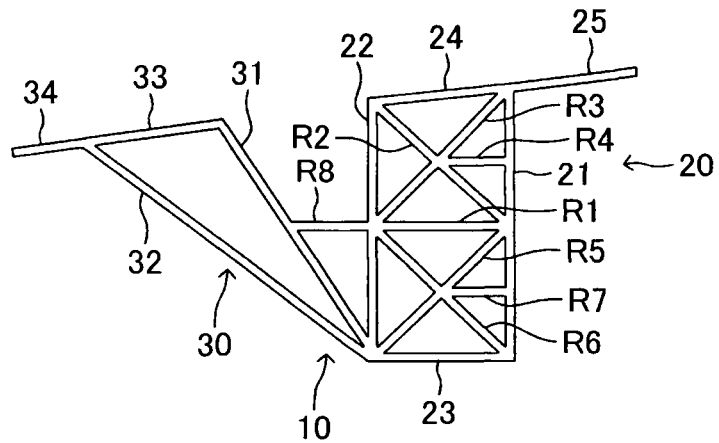
FIG. 4C is a plan view of the shock absorbing member, in which a portion of the inner wall portion side of the two ribs extending in the vehicle width direction of the shock absorbing portion of FIG. 2 is omitted.

Further, for example, the configuration of the ribs provided in the spaces SP1 and SP2 of the shock absorbing portion 20 is not limited to the above embodiments. For example, as shown in FIG. 4A, it is possible to omit the rib R4 and the rib R7. Further, as shown in FIG. 4B, it is possible to omit, from the rib R4, a portion which extends from the intersection of the rib R2 and rib R3 to the inner wall portion (21) side, and it is possible to omit, from the rib R7, a portion which extends to the inner wall portion (21) side from the intersection of the rib R5 and rib R6. Further, as shown in FIG. 4C, it is possible to omit, in the rib R4, a portion which extends from the intersection of the rib R2 and rib R3 to the outer wall (22) side, and it is possible to omit, in the rib R7, a portion which extends to the outer wall (22) side from the intersection of the ribs R5 and rib R6. Accordingly, since it is possible to enlarge a core used for forming a hollow portion in the extrusion process, it is easy to process the shock absorbing member 10.

Figure 4D:
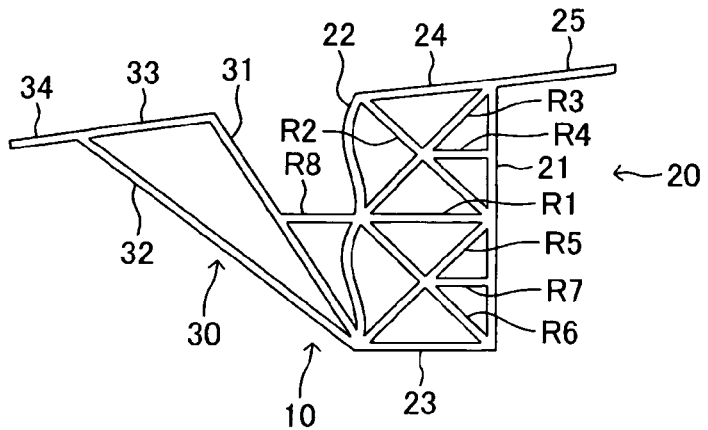
FIG. 4D is a plan view of the shock absorbing member, in which a portion of the outer wall portion side of the two ribs extending in the vehicle width direction of the shock absorbing portion of FIG. 2 is omitted and also the outer wall portion is formed in a wave form.

In the case where portions of the rib R4 and rib R7 are omitted as shown in FIG. 4B or FIG. 4C, a difference in the buckling strength occurs between the portion of the inner wall portion (21) side and the portion of the outer wall portion (22) side of the shock absorbing portion 20, when the load due to the collision is applied to the shock absorbing portion 20. Therefore, there is a possibility that the buckling position of the inner wall portion 21 and the buckling position of the outer wall portion 22 are dislocated in the front-rear direction. Further, there is a possibility that the buckling timing of the inner wall portion 21 and the buckling timing of the outer wall portion 22 do not coincide. Thus, for example, in the case where, among the rib R4 rib and rib R7, portions which extend to the inner wall portion (21) side are omitted, as shown in FIG. 4D, it may configure the outer wall portion 22 so as to exhibit the wave form in a plane view. Specifically, it may be formed in such a manner that, in the outer wall portion 22, the front portion being located between the front wall portion 24 and the rib R1 protrudes toward the outside of the vehicle width direction, and the rear portion being located between the front wall portion 24 and the rib R1 enters the vehicle-width-direction inside. In addition, it may be formed in such a manner that, in the outer wall portion 22, the front portion being located between the rear wall portion 23 and the rib R1 protrudes toward the outside of the vehicle width direction, and the rear portion being located between the rear wall portion 23 and the rib R1 enters the vehicle-width-direction inside. According to this, since buckling occurs at each of the vertices of the portion which has protruded in the vehicle-width-direction outside and the portion which has entered the vehicle-width-direction inside, in the outer wall portion 22, it is possible to suppress the buckling position of the inner wall portion 21 and the buckling position of the outer wall portion 22 from being dislocated largely in the front-rear direction. Further, it is possible to the buckling timing of the inner wall portion 21 and the buckling timing of the outer wall portion 22.

Figure 4E:
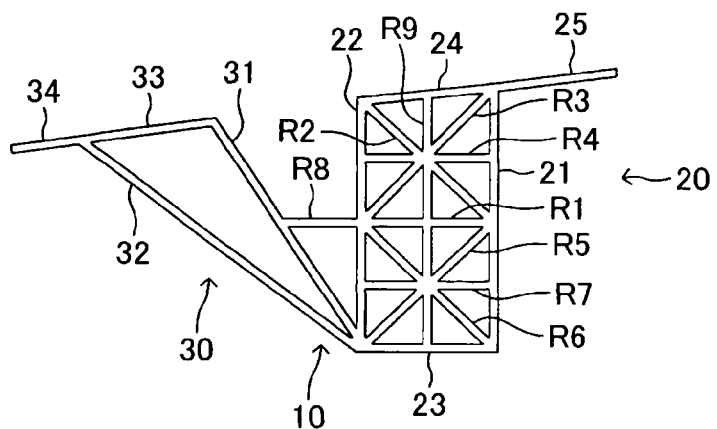
FIG. 4E is a plan view of the shock absorbing member, in which a rib extending in the front-rear direction of the vehicle is added to the shock absorbing portion of FIG. 2.
Figure 4F:
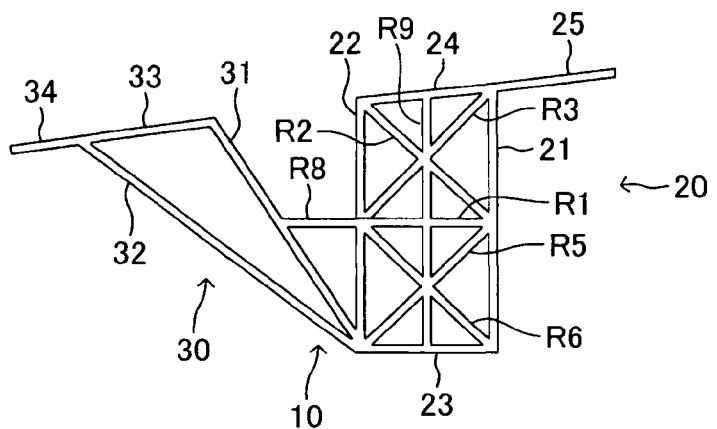
FIG. 4F is a plan view of the shock absorbing member, in which a rib extending in the front-rear direction of the vehicle is added to the shock absorbing portion of FIG. 2 and also the two ribs extending in the vehicle width direction are omitted.

Further, as shown in FIG. 4E, it may be further provided with the rib R9, which extends rearward from the vehicle width direction central portion of the front wall portion 24, and is connected to the intersection of the rib R2 and rib R3, rib R1, the intersection of rib R5 and rib R6, and the rear wall portion 23. According to this, it is possible to improve the buckling strength. Further, as shown in FIG. 4F, the rib R9 is provided, and the rib R4 and the rib R7 may be omitted.

What is claimed is:

1. A shock absorbing member provided between a side member extending in a front-rear direction of a vehicle and a bumper reinforcement extending in a vehicle width direction and provided at at least one of a front and a rear of the side member, comprising:
   a shock absorbing portion, which extends in the front-rear direction of the vehicle and is supported by the side member and which is configured to absorb an impact caused by a load by being compressed in the front-rear direction of the vehicle when the load is applied to the bumper reinforcement in at least one of a forward direction and a backward direction; and
   a bumper reinforcing portion, which extends from an end portion side chaser to the side member in the impact absorbing portion toward a vehicle-width-direction outside and a bumper reinforcement side and which supports a vehicle-width-direction end portion side of the bumper reinforcement to reinforce the vehicle-width-direction end portion side of the bumper reinforcement;
   wherein the shock absorbing portion and the bumper reinforcing portion are formed integrally in one piece by extrusion molding.

2. The shock absorbing member according to claim 1, wherein the bumper reinforcing portion is formed so that a width of the bumper reinforcing portion in the vehicle width direction becomes longer as forwarding to the end portion of the bumper reinforcement side from the end portion closer to the side member of both the end portions of the vehicle front-rear direction of the bumper reinforcing portion.

3. The shock absorbing member according to claim 2, wherein the bumper reinforcing portion comprises:
   a first support portion, which extends toward the vehicle-width-direction outside and the bumper reinforcement side from the end portion side closer to the side member in the impact absorbing portion and which is connected to the vehicle-width-direction end portion side of the bumper reinforcement; and
   a second support portion, which extends toward a vehicle-width-direction end part, which is an outer side than the first support portion, and the bumper reinforcement side from the end portion side closer to the side member in the impact absorbing portion and which is connected to the vehicle-width-direction end portion side of the bumper reinforcement.

4. The shock absorbing member according to claim 1, further comprising
   a connecting portion that connects the shock absorbing portion and the bumper reinforcing portion.

5. The shock absorbing member according to claim 1, wherein the bumper reinforcing portion is configured to deform toward an outer side in the vehicle-width-direction in case that a collision is applied to the bumper reinforcement in the at least one of the front and the rear of the vehicle.

* * * * *